United States Patent [19]
Abnett et al.

[11] 3,750,010
[45] July 31, 1973

[54] VIBRATION ANALYZER PROBE WITH REDUCED TEMPERATURE SENSITIVITY

[75] Inventors: Albert C. Abnett, Westerville; Robert A. Boley, Columbus, both of Ohio

[73] Assignee: Reliance Electric Company, Columbus, Ohio

[22] Filed: Mar. 25, 1970

[21] Appl. No.: 22,602

[52] U.S. Cl.................. 324/34 D, 324/61, 323/75, 336/179
[51] Int. Cl............................................. G01r 33/00
[58] Field of Search................... 324/34 R, 40, 41, 324/65 B; 323/75 L; 336/30, 179

[56] References Cited
UNITED STATES PATENTS

| | | | |
|---|---|---|---|
| 3,450,985 | 6/1969 | Lorenzi et al. | 324/40 |
| 3,434,340 | 3/1969 | Strasberg et al. | 73/71.4 |
| 3,521,158 | 7/1970 | Morrow et al. | 324/34 |

FOREIGN PATENTS OR APPLICATIONS

| | | | |
|---|---|---|---|
| 1,123,119 | 2/1962 | Germany | 323/75 L |

*Primary Examiner*—Rudolph V. Rolinec
*Assistant Examiner*—R. J. Corcoran
*Attorney*—Le Blanc and Shur

[57] ABSTRACT

Disclosed is a simplified and inexpensive probe for non-contacting vibration analyzers, and an analyzer employing the probe, which probe is substantially insensitive to temperature variations. The probe comprises a bridge including sensor and reference coils in two bridge legs forming the primaries of two transformers. A pair of resistors form the other bridge legs. The bridge is excited from an AC source and the transformer secondaries are coupled through a pair of large resistors to the remainder of the vibration analyzer.

10 Claims, 7 Drawing Figures

FIG. 2
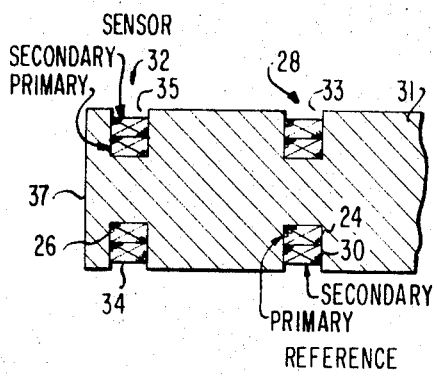
FIG. 3A
OSCILLATOR SIGNAL
FIG. 3B
AMPLIFIER 46 OUTPUT
(SENSING VIBRATING SURFACE)
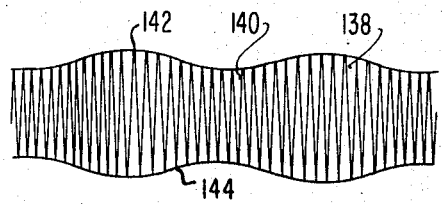
FIG. 3C
OUTPUT OF DETECTOR 50
AND FILTER 52 ($V_O$)
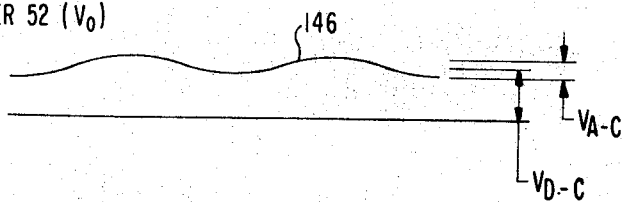
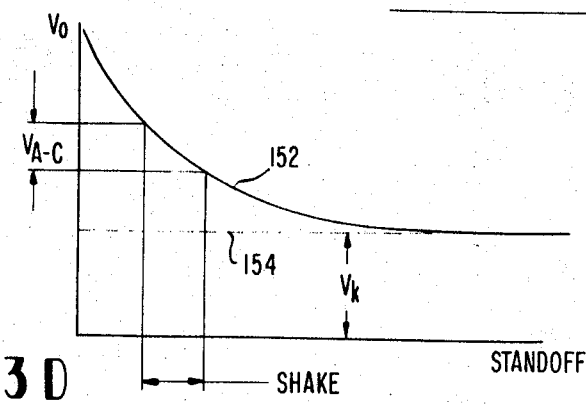
FIG. 3D
D-C STANDOFF FUNCTION
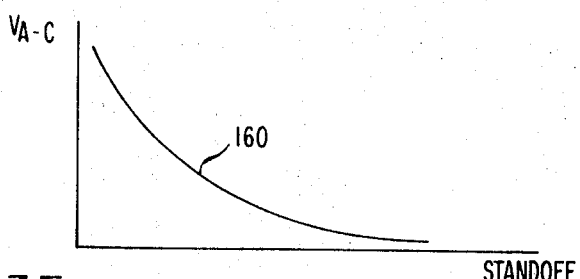
FIG. 3E
A-C STANDOFF FUNCTION
INVENTOR
ALBERT C. ABNETT
ROBERT BOLEY

VIBRATION ANALYZER PROBE WITH REDUCED TEMPERATURE SENSITIVITY

This invention relates to a vibration analyzer incorporating a non-contacting probe having reduced sensitivity to temperature variations at the probe.

Vibration analyzers are well known for measuring vibration and particularly the vibration of rotating shafts. In many instances the vibration analyzers have included sensors attached directly to the vibrating equipment to be measured. These constructions have suffered from serious disadvantages, including the fact that it is difficult to measure with them extremely small displacements.

It has also been proposed to measure shaft vibration through the use of so-called non-contacting vibration monitors where the sensor is in the form of a capacitive or inductive probe which is spaced from and does not directly contact the equipment whose vibrations are to be measured. One of the difficulties encountered in the use of non-contacting vibration monitors is that the monitors have been sensitive to variations in temperature at the probe. Attempts to avoid temperature sensitivity have necessitated the provision of more or less elaborate temperature compensating constructions which tend to unduly increase both the size and cost of the probe and associated vibration analyzer equipment.

The present invention is directed to a simplified and inexpensive non-contact vibration analyzer and particularly to an analyzer in which the non-contacting probe is rendered substantially less sensitive to temperature variations so that the electrical output signal of the analyzer is a more accurate representation of the vibration of the metal surface being tested. The probe takes the form of an inductive transducer comprising a pair of coils, hereafter referred to as the sensor coil and the reference coil, spaced a short distance apart. These two coils are transformer coupled to the input of the vibration analyzer. In addition, the two coils are connected in a bridge with two resistors forming the upper bridge legs. The resistors are made large with respect to the primary coil impedances so the coils are essentially driven from constant current sources.

In the probe of the present invention, the primary effect of temperature is to change the resistance of the windings. Although this results in a change in voltage drop across the primary coils, the primary currents change very little and very little change is transferred to the transformer secondaries. The resistances coupling the probe to the analyzer output are also chosen to be quite large with respect to the resistances of the secondary coils so that a change in the secondary resistances due to temperature is very small compared to the total circuit resistance and no unbalance signal occurs. The overall effect is a simplified and inexpensive probe construction in which the instrument operates substantially independent of the temperature conditions that exist at the probe.

It is therefore one object of the present invention to provide an improved vibration analyzer.

Another object of the present invention is to provide an improved non-contacting type probe particularly adapted for use in non-contact vibration analyzers.

Another object of the present invention is to provide an improved vibration analyzer probe having substantially reduced temperature sensitivity.

Another object of the present invention is to provide a vibration analyzer having an improved inductive type non-contacting probe in which changes in temperature conditions at the probe have little or no effect on the output of the instrument.

Another object of the present invention is to provide a simplified and inexpensive probe construction for vibration analyzers which is substantially insensitive to temperature.

These and further objects and advantages of the invention will be more apparent upon reference to the following specification, claims, and appended drawings, wherein:

FIG. 2 is a partial cross section through the probe showing the relationship of the probe primary and secondary winding constructions; and FIGS. 3-A through 3-E are waveform and transfer functions for the circuit of FIG. 1 illustrating the manner of its operation.

Figure 1:
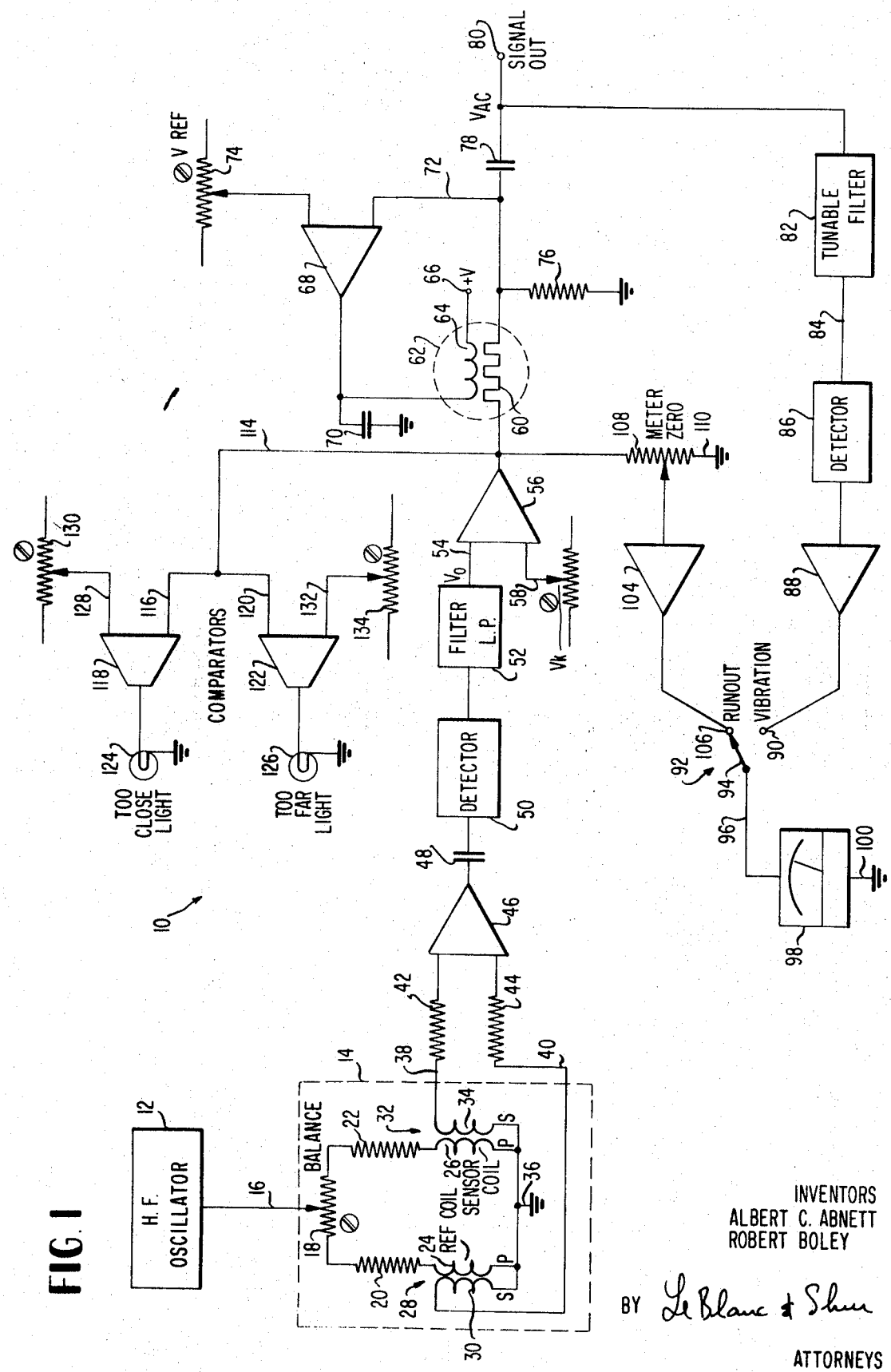
FIG. 1 is a simplified block diagram of a standoff independent non-contact vibration analyzer incorporating the improved probe construction of the present invention.

Referring to the drawings and particularly to FIG. 1, the vibration analyzer, generally indicated at 10 in that figure, comprises a high frequency oscillator 12 feeding its output to a non-contacting probe of the present invention indicated by the dashed box 14. The oscillator 12, which by way of example only may typically operate at a frequency of 100 KHz or 1 MHz, depending upon the application, supplies a signal to the probe by way of lead 16 and a balancing potentiometer 18. Forming a portion of the probe is a bridge circuit comprising resistors 20 and 22 forming the two upper arms of the bridge and a pair of coils or transformer primary windings 24 and 26 forming the lower arms of the bridge. Coil 24, which will hereafter be referred to as the reference coil, forms the primary of a transformer 28 having a secondary winding 30 and coil 26, hereafter referred to as the sensor coil, similarly forms the primary of a transformer 32 having a secondary winding 34. The lower ends of the primary and secondary windings of the transformer are returned to ground as indicated at 36.

Referring to FIG. 2, the transformer windings are wound about a central core 31 having a pair of spaced annular grooves or slots 33 and 35. Slot 35 is located a short distance back from the probe face 37 which is positioned adjacent the metal surface whose vibration is to be measured. As can be seen from FIG. 2, slot 35 contains the windings forming transformer 32 including the inner primary or sensor coil 26 and the outer winding 34 forming the secondary of the transformer. Slot 33 is spaced approximately one-half inch from slot 35 and its inner winding forming part of transformer 28 is the reference coil 24 surrounded by the other winding forming secondary 30.

The upper end of secondary 34 is connected through a resistor 42 to the input of a difference amplifier 46. The upper end of the reference coil secondary 30 is similarly connected through a resistor 44 to the other output of difference amplifier 46. As a metal surface is brought into proximity to the sensor transformer 32 adjacent the face 37 of the probe, the bridge formed by resistors 20, 22 and primary windings 24 and 26 becomes unbalanced causing an AC signal to appear through resistors 42 and 44 at the inputs of amplifier 46. The unbalanced signal results from both a change in inductance of the sensor coil and a change in the coefficient of coupling between the primary and secondary of the sensor transformer 32.

The output on leads 38 and 40 passes through the resistors 42 and 44 to amplifier 46 and by way of a coupling capacitor 48 to a detector 50 and low pass filter 52 to appear as a DC output signal labeled $V_o$ on lead 54. The output signal is applied to one input of a difference amplifier 56 having its other input connected to a reference voltage source established by the position of potentiometer 58. The reference voltage level established by potentiometer 58 applied to the second input of amplifier 56 is labeled $V_k$. The output of amplifier 56 passes through a light sensitive variable resistor 60 in a common housing indicated by the dashed circle 62 with a light source or electrical filament 64. Filament 64 is connected between a positive voltage source terminal 66 and the output of a differential feedback amplifier 68. The output of amplifier 68 has an AC return to ground through capacitor 70 while one input is connected by lead 72 to the other side of light sensitive resistor 60. The other input of amplifier 68 is connected to a reference voltage source with the magnitude established by adjustable potentiometer 74.

Light sensitive resistor 60 in conjunction with a shunt resistor 76 forms a voltage divider and the voltage developed across resistor 76 is applied through a coupling capacitor 78 to an AC voltage signal output terminal 80 with the voltage appearing on this terminal labeled $V_{ac}$.

Connected to AC terminal 80 is the input of a tunable filter 82 whose output is connected by way of lead 84 to a detector 86 and through amplifier 88 to one stationary contact 90 of a manually operated switch generally indicated at 92. Movable contact 94 of the switch is connected by way of lead 96 to the input of a DC meter 98. The other side of the meter is grounded as at 100.

The output of difference amplifier 56 is connected through a meter zero potentiometer 108 and amplifier 104 to a second stationary contact 106 of switch 92. The amplifier output is also connected by way of lead 114 to one input 116 of a comparator 118 and to one input 120 of a second comparator 122. The output of comparator 118 energizes a too close light 124 and the output of comparator 122 energizes a too far light 126. The limits for energizing the lights are established by connecting the other input 128 of comparator 118 to a reference voltage potentiometer 130 and by connecting the other input 132 of comparator 122 to a reference voltage potentiometer 134.

FIG. 3–A shows the voltage waveform 136 at the output of oscillator 12 appearing on lead 16. The proximity of a ferrous metal, such as SAE 1045 steel or similar carbon steels, produces an unbalance in the bridge to supply an output to amplifier 46. The output from amplifier 46 is shown by the waveform 138 in FIG. 3–B and comprises a carrier 140 at the frequency of oscillator 12 amplitude modulated by an unbalance signal as indicated by the envelopes 142 and 144. The modulation is recovered by passing the signal through detector 50 and filter 52 to produce an output signal $V_o$ on lead 54 as shown by the waveform 146 in FIG. 3–C.

FIG. 3–D shows the standoff function with $V_o$ plotted as a function of standoff. The standoff function takes the form of an exponential curve as illustrated at 152 in FIG. 3–D, which curve asymtotes to a constant DC voltage level $V_k$ indicated by dashed line 154 at the standoff distance is increased. The AC component appears in FIG. 3–E as a function of standoff to give the exponential curve 160 shown in that figure.

It has been found empirically that a large portion of the exponential curve 152 shown in FIG. 3–D can be represented by the expression $V_o = AE^{-BS}+V_k$, in which A and B are constant and S is the standoff distance. Since the instrument is constructed to measure vibration, it is the derivative of the curve 152 that is of interest and the derivative curve shown at 160 in FIG. 3–E may be represented by $$V_{ac} = dv_o/dS = -BAE^{-BS}.$$

Since both curves 152 and 160 are similar exponentials, if the constant voltage of $V_k$ is removed, both the AC and DC components of the output signal $V_o$ vary in the same proportion as the standoff distance is changed. Removal of the constant voltage $V_k$ term is obtained in the amplifier 56 such that the output of the amplifier is the difference between the input signal $V_o$ on lead 54 and the voltage determined by the setting of potentiometer 58 which is chosen to equal $V_k$.

Use is made in the analyzer of the fact that the DC standoff function with the constant $V_k$ term removed and the derivative or AC standoff function 160 are similar exponential curves. That is, by changing the system gain in such a way as to maintain the DC level at a constant value, then the AC signal also remains constant as standoff is varied and any change in the AC output accurately represents changes in vibration magnitude. Automatic gain control is effected by the light dependent resistor 60 which forms with resistor 76 one leg of a voltage divider in combination with feedback amplifier 68 provided to control the bulb current to filament 64. This circuit functions to maintain the DC level of the signal at a constant voltage $V_{REF}$ as established by potentiometer 74 as the standoff is varied. In this way the AC signal is substantially independent of standoff.

When the manual switch 92 is manually moved to the runout position, i.e., with movable contact 94 engaging stationary contact 106, the unit functions in the manner of a non-contact dial indicator. If the probe is sensing the surface of a rotating shaft, the meter swings back and forth with the runout of the shaft. The zero set control potentiometer 108 should be adjusted so that the meter excursions are symmetrical on either side of the centerscale. In this way the total peak-to-peak runout is indicated by the total meter excursion.

With the switch 92 in the vibration mode, i.e., with movable contact 94 engaging stationary contact 90, the signal from the gain control circuit passes through the tunable filter 82 and the detector 86 where the AC signal is detected or rectified and applied through amplifier 88 and switch 92 to the meter 98. The AC output signal appears on terminal 80 so as to make the AC vibration signal available for firing a strobe.

By incorporating a bridge circuit in the probe 14, the instrument can be made substantially insensitive to temperature variations at the probe. However, since the sensor and reference coils are some distance apart (usually about one-half inch), it is possible for a temperature gradient to exist between the two, thus causing a bridge unbalance due to the different resistive voltage drops across the coils 24 and 26 in the bridge. The two resistors 20 and 22 in the upper legs of the bridge are made large with respect to the primary coil impedances. In this way the coils are essentially driven from constant current sources. The primary effect of temperature is to change the resistance of the windings and although this results in a change in voltage drop across the primaries, the primary currents change very little, thus very little change is transferred to the secondary windings 30 and 34. Resistors 42 and 44 in the secondary winding circuits are chosen large with respect to the resistances of secondary windings 30 and 34. In this way a change in the resistances of the secondary windings due to temperature is very small compared to the total circuit resistance and little or no unbalance signal occurs. The overall effect is that the instrument operates independent of temperature conditions at the probe.

The distance between the probe tip and the vibrating surface should be set at a value such that neither the too close nor the too far lamps are on. If the probe is rigidly mounted, the low frequency response is about 8 Hz. By incorporating a 20 Hz filter in the circuit, the probe may be hand held for frequencies above 20 Hz. The high frequency response is to about 10 kHz. For frequencies between about 8 Hz and 2.5 kHz, the tunable bandpass filter 82 is used to improve the signal to noise ratio. The wideband noise is typically 300 microinches. With filtering this drops to less than 50 microinches.

It is apparent from the above that the present invention provides an improved vibration monitor or analyzer that gives an accurate vibration output signal from a non-contact probe that is substantially independent of standoff distance. Important features of the present invention include a probe construction in the form of an inductive bridge circuit including a reference coil and a sensor coil in which both coils are inductively coupled to the output. Also provided are relatively large resistors in series with both the primary and secondary windings of the probe sensor transformer coils. With this construction, changes in temperature at the site of the probe produce little or no changes in the electrical output signal of the analyzer so that the instrument is substantially insensitive to temperature variations.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A substantially temperature insensitive probe for a non-contact vibration analyzer comprising: a bridge having a first resistor in a first arm of said bridge, a second resistor in a second arm of said bridge, a reference coil in a third arm of said bridge, and a sensor coil in a fourth arm of said bridge; first means for coupling an oscillator to a point on said bridge intermediate said first and second resistors and second means for coupling said oscillator to a point intermediate said reference and sensor coils; a third coil inductively coupled to said reference coil; a fourth coil inductively coupled to said sensor coil; a third resistor in series with said third coil; a fourth resistor in series with said fourth coil, said first and second resistors being of high resistance relative to the resistances of said reference and sensor coils, and said third and fourth resistors being of high resistance relative to the resistances of said third and fourth coils, and means for coupling said third and fourth coils and resistors to the input of a vibration analyzer.

2. A probe according to claim 1 wherein said reference and sensor coils comprise the primaries of first and second transformers, and wherein said third and fourth coils comprise the secondaries of said first and second transformers, respectively.

3. A probe according to claim 1 wherein said oscillator operates at a frequency of from about 100 KHz to about 1 MHz.

4. A probe according to claim 1 wherein said first resistor and said reference coil are connected in series between said first oscillator coupling means and a ground terminal, said second resistor and sensor coil are connected in series between said first oscillator coupling means and said ground terminal, and said third and fourth coils are connected in series, with a junction therebetween connected to said ground terminal.

5. A probe according to claim 4 wherein said first coupling means comprises a balancing potentiometer having its ends connected between said first and second resistors, and its arm adapted to be connected to said oscillator.

6. A probe according to claim 5 wherein all said coils are wound on a common core.

7. A probe according to claim 1 including a core having a pair of spaced annular slots, said third coil being wound over said reference coil in one of said slots, and said fourth coil being wound over said sensor coil in the other of said slots.

8. A probe according to claim 7 wherein said core has an end with a flat face, said sensor coil and said fourth coil being in the slot nearest said face.

9. A probe according to claim 8 wherein said slots are spaced apart about one-half inch along the length of said core.

10. A noncontact vibration analyzer comprising a probe as defined in claim 1; an oscillator connected to said first and second coupling means; and measuring means connected to said third and fourth resistors, said measuring means being operative to produce a signal having AC and DC components which vary similarly with a standoff distance of said probe from a metal surface, and including an automatic gain control circuit responsive to said DC component for maintaining the same constant, whereby said AC component is substantially independent of standoff.

* * * * *